(12) United States Patent
Wachel (10) Patent No.: US 6,700,917 B1
(45) Date of Patent: Mar. 2, 2004

(54) METHOD AND APPARATUS FOR INCREASING SOFT MODEM CAPACITY

(75) Inventor: Robert David Wachel, Altadena, CA (US)

(73) Assignee: Intel Corporation, Santa Clara, CA (US)

( * ) Notice: Subject to any disclaimer, the term of this patent is extended or adjusted under 35 U.S.C. 154(b) by 651 days.

(21) Appl. No.: 09/608,824

(22) Filed: Jun. 30, 2000

(51) Int. Cl.⁷ ............................... H04B 1/33; H04L 5/16
(52) U.S. Cl. .................. 372/222; 375/220; 375/221; 375/227; 375/232; 370/463; 370/465
(58) Field of Search ................. 375/219, 220, 375/222, 231, 377; 370/463, 465

(56) References Cited

U.S. PATENT DOCUMENTS 6,112,266 A * 8/2000 Yeh .............................. 710/52
6,160,843 A * 12/2000 McHale et al. ............. 375/222
6,229,795 B1 * 5/2001 Pankaj et al. ................ 370/329
6,434,165 B1 * 8/2002 Sherer et al. ................ 370/465

* cited by examiner

Primary Examiner—Don N. Vo
Assistant Examiner—Qutub Ghulamali
(74) Attorney, Agent, or Firm—Blakely, Sokoloff, Taylor & Zafman LLP (57) ABSTRACT

A method and apparatus for reducing processing requests of a pool of soft modems is disclosed. In one embodiment, a remote access concentrator comprises a memory, a processor, an interface bus, and a host interface. In one embodiment, the processor is coupled to the memory to operate a pool of soft modems in parallel with a common retrain handler, the common retrain handler includes a queue to store retrain requests, a request management block to retrieve the retrain requests and to identify modems that correspond to the retrain requests within a period of time, and a retrain engine to perform retrain procedures in accordance with modem standards.

6 Claims, 7 Drawing Sheets

METHOD AND APPARATUS FOR INCREASING SOFT MODEM CAPACITY

FIELD OF THE INVENTION

This invention relates to communication technologies generally and particularly to soft modem technologies.

BACKGROUND OF THE INVENTION

Figure 1:
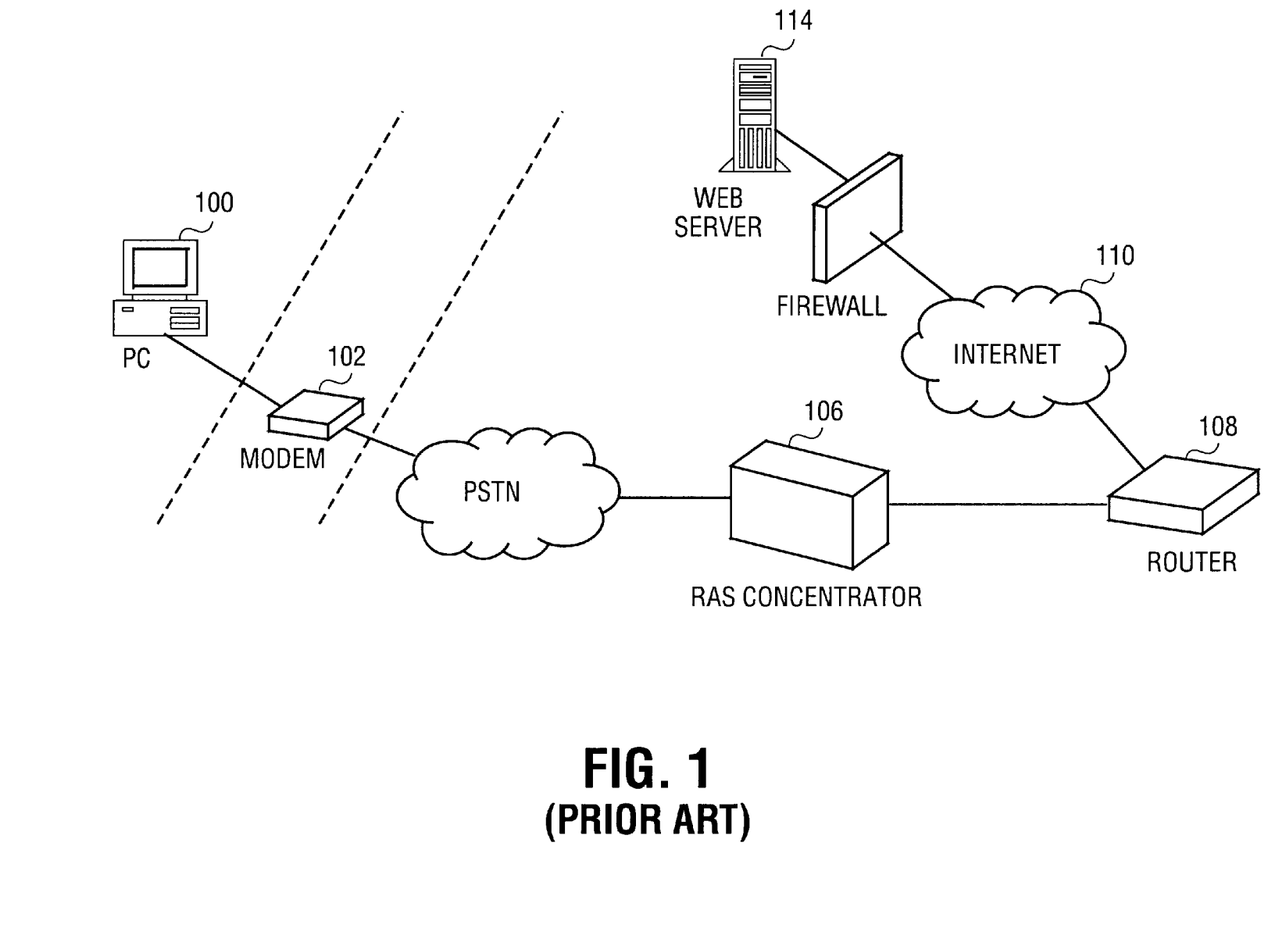
FIG. 1 illustrates a modem pool in one network configuration.

Modems are communication devices that employ digital modulation techniques to transmit binary data across analog channels. In order to ensure interoperability, modems often conform to international standards. Some examples are, but not limited to, the V.90 standard described in International Telecommunication Union (hereinafter ITU)-T Recommendation V.90, 9/1998 and the G.Lite standard described in ITU-G Recommendation G.922.2, 6/1999. In a typical configuration as shown in FIG. 1, several modems, or a modem pool, in remote access service (hereinafter RAS) concentrator 106 and modem 102 together provide user computer 100 access to servers on Internet 110. Specifically, the first available modem of the modem pool in RAS concentrator 106 would terminate the incoming call from modem 102. After having established a connection, RAS concentrator 106 then directs upper layer traffic (such as Web browsing requests) to router 108 that in turn routes the traffic to appropriate destinations, such as web server 114.

Figure 2:
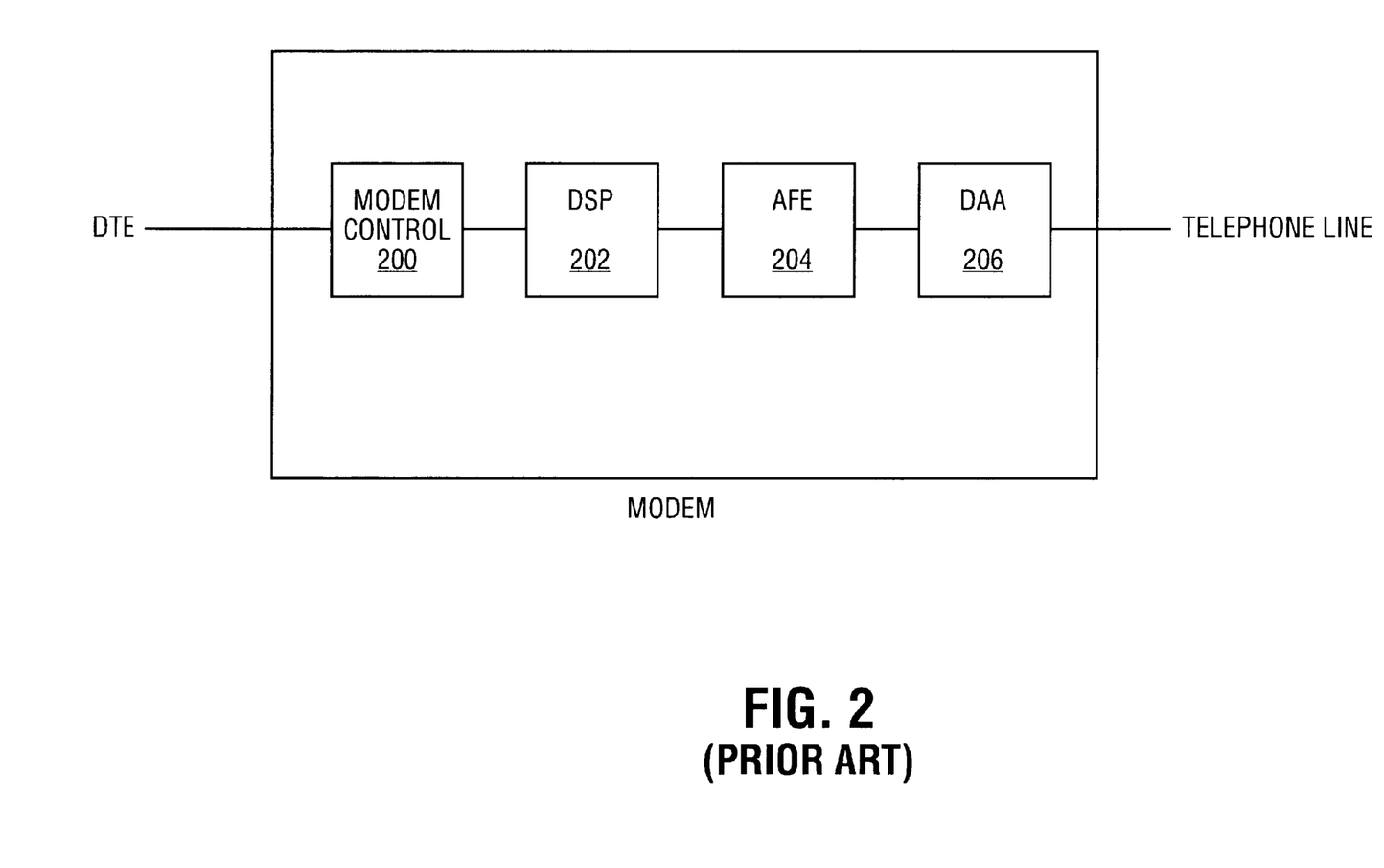
FIG. 2 demonstrates functional blocks of a modem.

A modem contains at least four functional blocks as shown in FIG. 2. Though one ordinarily skilled in the art can partition these blocks differently. First, modem control block 200 regulates the actions of digital signal processing (hereinafter DSP) block 202, interprets modem commands from a data terminal equipment (hereinafter DTE), performs error control and data compression functions and finally sends and receives data. Second, DSP block 202 handles signal processing functions, such as, but not limited to, modulation, demodulation, echo cancellation, signal equalization, etc. DSP block 202 is sometimes referred to as the modem data pump. Third, analog front end (hereinafter AFE) 204 performs both analog-to-digital and digital-to-analog conversions. AFE 204 is sometimes referred to as CODEC or COder/DECoder. Lastly, data access arrangement (hereinafter DAA) 206 interfaces the modem to the phone line. DAA 206 not only provides safety protection to end users, but also provides features including, without limitation, voltage isolation, caller identification signal detection, ring signal detection and on-hook and off-hook functionality.

Instead of implementing these functional blocks with dedicated hardware, modem manufacturers, in efforts to reduce cost and improve performance, have shifted towards software solutions that take advantage of inexpensive yet powerful and highly integrated processors. For example, rather than building the modem pool in RAS concentrator 106 with individual modem boards, the modem pool can be a collection of software modems, or soft modems, that operate on one or more processors on a single board. One prior art design approach for such a single board arrangement is to select an appropriate processor that is capable of satisfying the aggregated peak computation load of its supported soft modems. Thus, if a processor supports eight soft modems, the processor should have sufficient processing capacity to accommodate the eight soft modems simultaneously operating under peak computation load conditions. One such condition is caused by a "retrain", which occurs when the quality of a connection does not allow reliable communications over the full bandwidth expected by modems. However, because soft modems do not always operate under these peak conditions, the mentioned prior art design approach squanders many processor cycles.

Therefore, an improved method and apparatus is needed to provide a costeffective solution to further increase capacity of a soft modem pool.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and an apparatus for reducing processing requirements of a pool of soft modems are disclosed. In the following description, numerous specific details are set forth in order to provide a thorough understanding of the present invention. However, it will be apparent to one of ordinary skill in the art that the invention may be practiced without these particular details. In other instances, well-known elements and theories, such as multi-process/multi-thread programming techniques, modulation and echo cancellation algorithms, etc. have not been discussed in special details in order to avoid obscuring the present invention.

Moreover, throughout the following discussions, the terms, "soft modem" and "software modem", are used interchangeably to refer to software-based modem. A soft modem performs the functionality of modem control block 200 and DSP block 202 as shown in FIG. 2 in software. A soft modem can operate on various types of processors. Some examples are, but not limited to, general purpose microprocessors, digital signal processors, etc. Also, the term "soft modem pool" or "a pool of soft modems" broadly refers to a collection of soft modems. As has been discussed in the Background section, when the quality of the telephone line deteriorates to a certain degree, a "retrain" may occur. Typically, a retrain involves sending out and responding to specific signals, deciding on a symbol rate, carrier frequency, etc. and exchanging data modulation parameters. Modem standards, such as V.90, detail situations that require retraining and provide necessary sequences to accomplish a retrain. Finally, a machine readable medium refers to, but not limited to, a storage device, a memory device, a carrier wave, etc.

Figure 3:
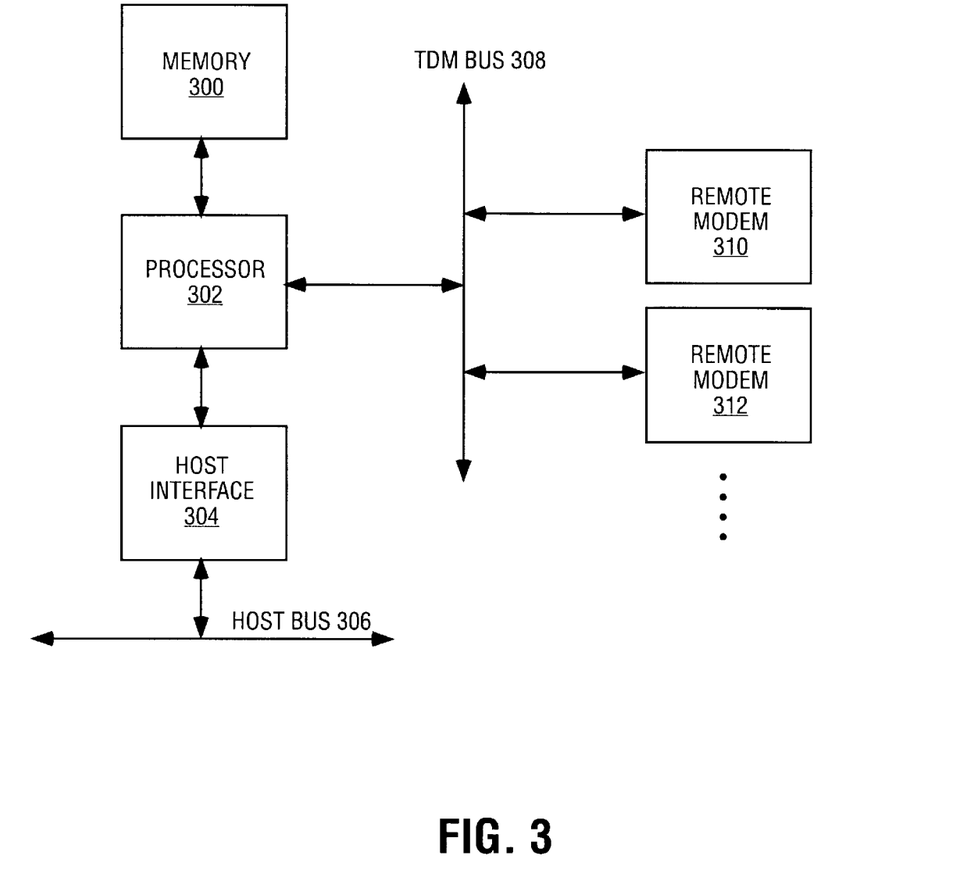
FIG. 3 illustrates a general block diagram of one platform that operates one embodiment of an enhanced soft modem pool.

FIG. 3 illustrates a general block diagram of one platform that operates one embodiment of an enhanced soft modem pool. This "enhanced soft modem pool" refers to a soft modem pool that shares a common retrain handler and is further discussed in conjunction with FIGS. 4, 5, 6(*a*) and 6(*b*) in subsequent paragraphs. This platform contains components such as memory 300, processor 302, host interface 304, host bus 306 and time division multiplexed bus (hereinafter TDM bus) 308. In particular, processor 302 executes copies of modem software for the soft modems and also the software routines for the common retrain handler that are stored in memory 300. Each copy of the modem software performs functions represented by blocks 200 and 202 as shown in FIG. 2, except for retrain handling functionality. Such functionality has been shifted into the common retrain handler. Additionally, processor 302 may also contain on-chip memory to further accelerate processing of this enhanced soft modem pool.

Time division multiplexing is a data communications technique that interleaves separate data streams into one integrated transmission by assigning each data stream a distinct time slice. The connections established through TDM bus 308 between the enhanced soft modem pool and remote modems such as remote modems 310 and 312 thus appear to be dedicated links. It should however be noted that one ordinarily skilled in the art could apply a number of interface techniques other than TDM bus 308 without exceeding the scope of the present invention.

In addition to communicating with remote modems, processor 302 of this platform discussed above also processes information received from remote modems 310 and 312 and funnels the processed information through host interface 304 to host bus 306. In conjunction with FIG. 1, one embodiment of the platform further couples host bus 306 to router 108 and thus allows the processed information to be routed to appropriate destinations, such as web server 114.

Figure 4:
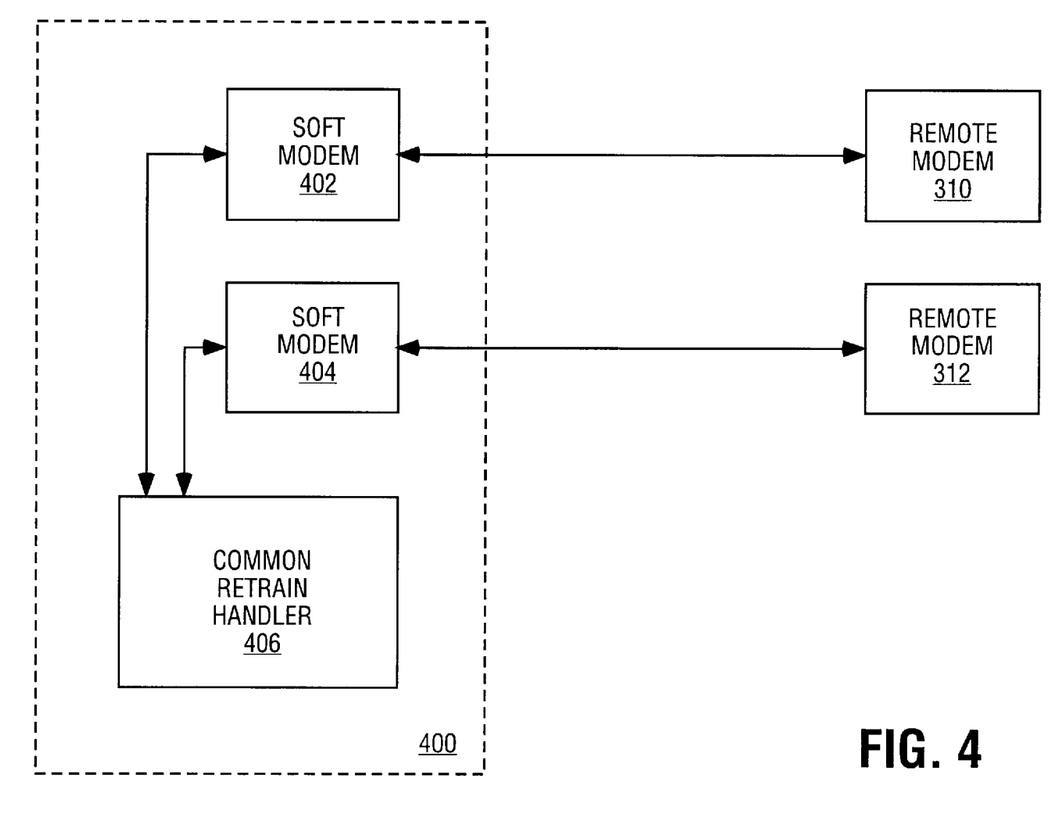
FIG. 4 illustrates one logical interconnectivity among an enhanced soft modem pool and remote modems.

With an enhanced soft modem pool operating on some platforms such as the one discussed above, each soft modem in the pool behaves as an individual modem that connects to a remote modem, such as remote modem 310 or 312, via a dedicated link. FIG. 4 illustrates one example of the logical interconnectivity among these modems and also a common retrain handler. Specifically, either soft modem 402 or 404 in enhanced soft modem pool 400 invokes common retrain handler 406 when it initiates or receives a retrain request. It should be noted that a retrain request broadly refers to any request that demands an initiation of a retrain.

Figure 5:
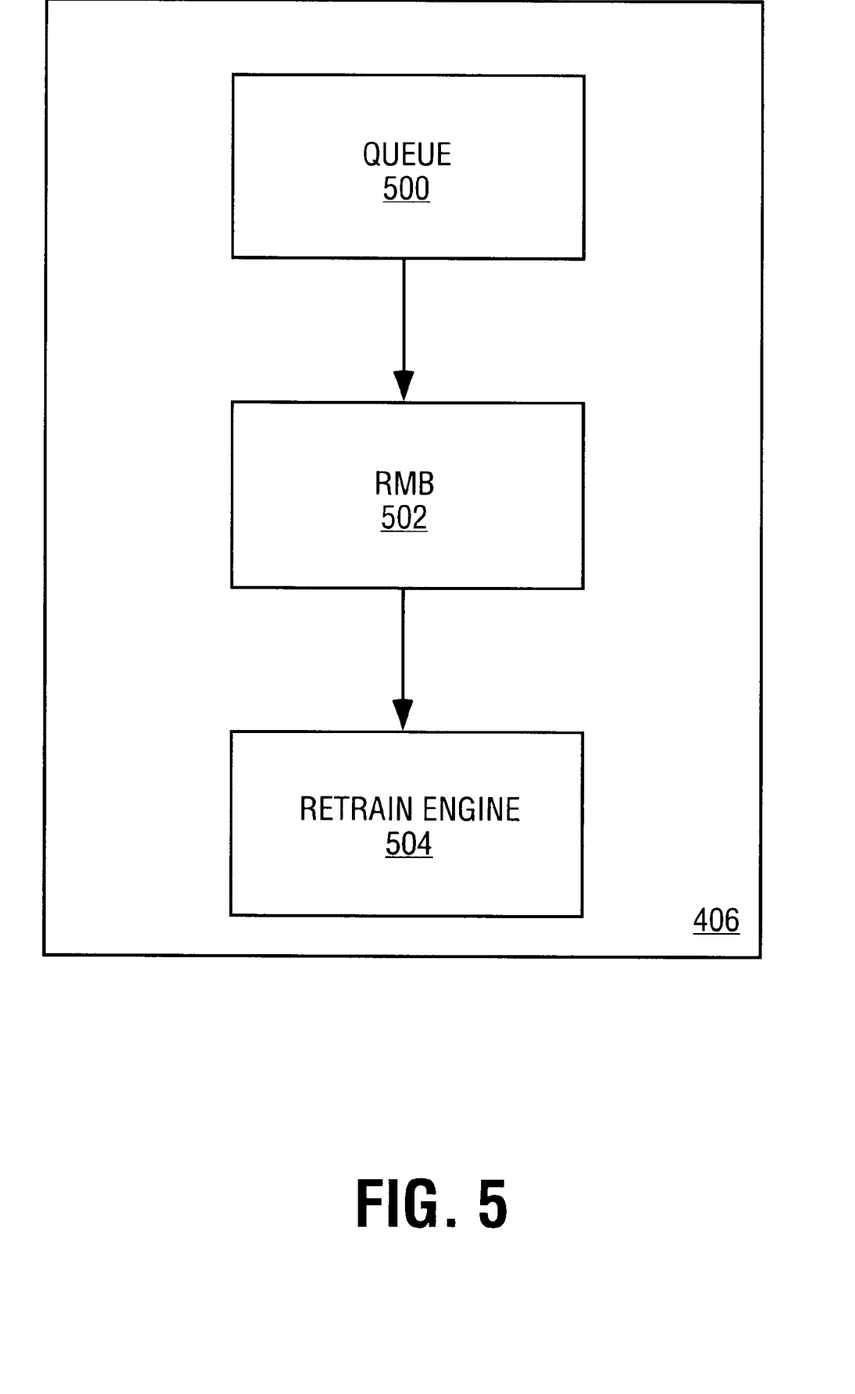
FIG. 5 illustrates a functional block diagram of one embodiment of a common retrain handler.

FIG. 5 illustrates a functional block diagram of one embodiment of common retrain handler 406. Specifically, the functional blocks are, queue 500, request management block 502 (hereinafter RMB 502) and retrain engine 504. Queue 500 may store a limited number of retrain requests. One implementation of queue 500 establishes the number by applying the following equation:

$$N=|T_1-T_2|/L_0, \text{ where} \qquad (1)$$

$T_1$=the time enhanced soft modem pool 400 either initiates or receives a retrain request $T_2$=the time the retrain request needs to be responded by (or risks a drop call, for example)

$L_0$=the length of time for common retrain handler 406 to respond to the retrain request and complete a retrain sequence N=the number of requests that queue 500 may have without interfering with normal operations of enhanced soft modem pool 400

With queue 500 containing less than or equal to N number of retrain requests, RMB 502 retrieves these requests for retrain engine 504 to respond to. RMB 502 also identifies appropriate modems that correspond to the retrain requests and relays such identification information to retrain engine 504. Furthermore, one embodiment of RMB 502 applies a first-in-first-out retrieval mechanism, such that the first retrain request to arrive in queue 500 also is the first to be sent to retrain engine 504. Such request retrieval can be conducted on a periodic basis.

Alternatively, RMB 502 employs a priority-based retrieval mechanism. More specifically, when a retrain request occurs more frequently than the others, that request is assigned with a higher priority than the other requests. In other words, retrain engine 504 would process the retrain requests according to their occurrence frequency. Although two retrieval mechanisms have been described, it should be apparent to an ordinarily skilled artisan to establish methods basing on parameters other than the receiving order or the occurrence frequency of retrain requests without exceeding the scope of the present invention.

Lastly, retrain engine 504 is implemented based on the procedures specified in the designated modem standard to successfully accomplish a retrain. As an illustration, when enhanced soft modem pool 400 operates software that conforms to the ITU-T Recommendation V.90, an embodiment of retrain engine 504 would adhere to the steps described in the Retrains section of the recommendation (Section 9.5, ITU-T Recommendation V.90, 9/1998).

Operation of One Embodiment of a Common Retrain Handler

Figure 6A:
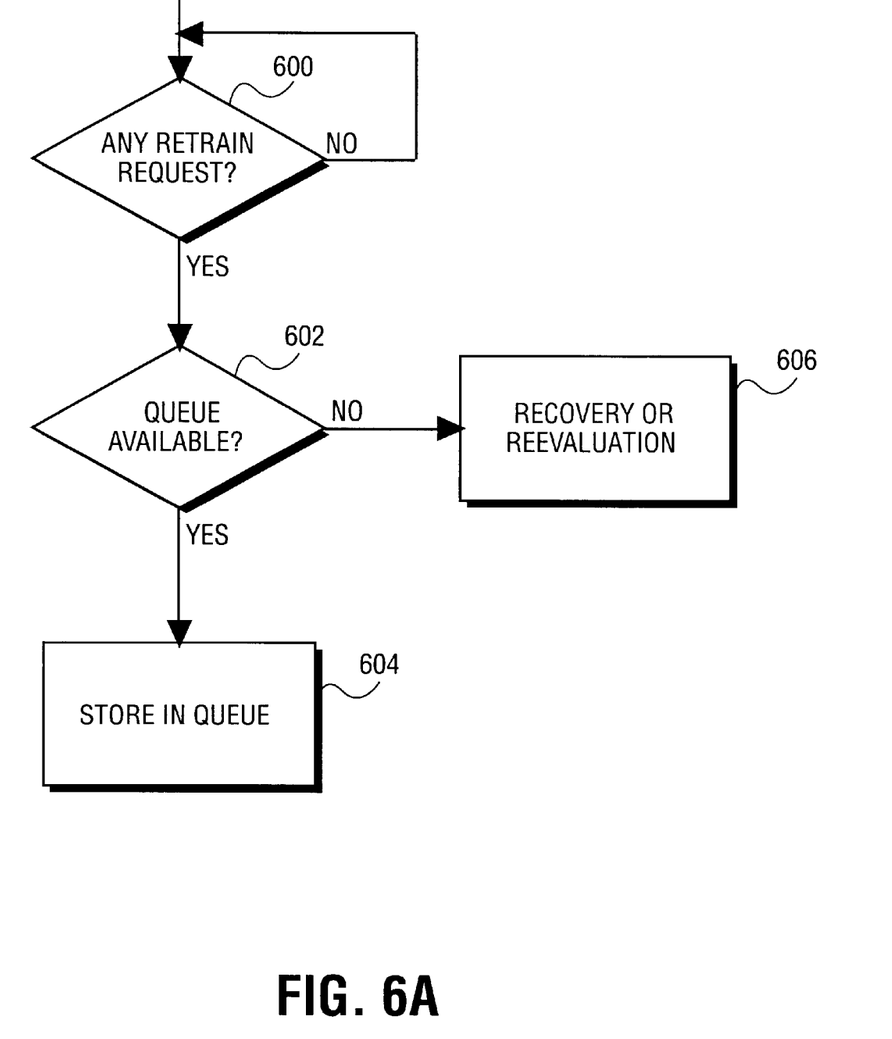
FIG. 6(a) illustrates a flow chart of one process that one embodiment of a common retrain handler follows.
Figure 6B:
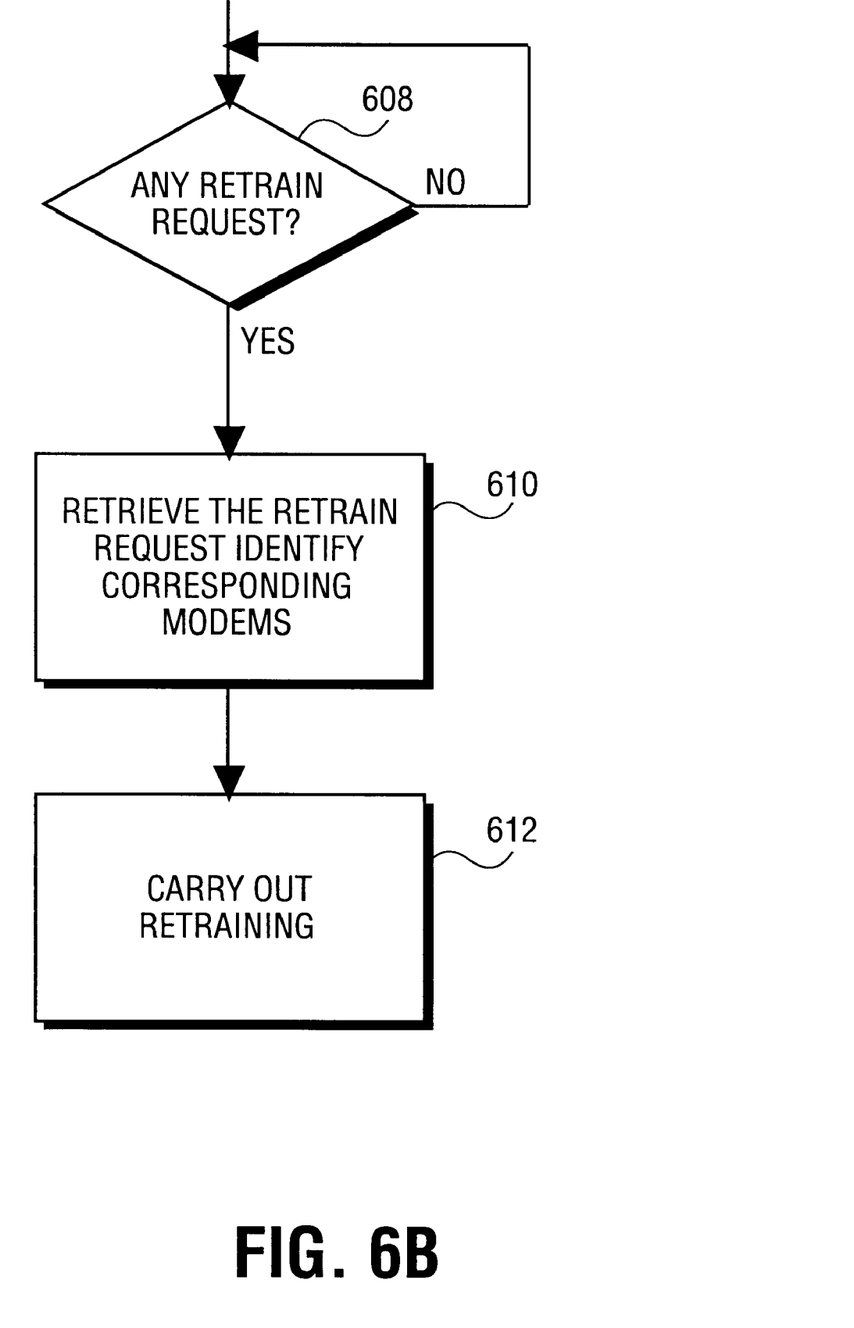
FIG. 6(b) illustrates a flow chart of another process that one embodiment of a common retrain handler follows.

FIGS. 6(*a*) and 6(*b*) illustrate flow charts of processes that one embodiment of a common retrain handler follows. More particularly, FIG. 6(*a*) demonstrates one thread that mostly corresponds to the operating mechanism of queue 500, and FIG. 6(*b*) demonstrates another thread that performs the functionality of RMB 502 and retrain engine 504. In this embodiment, these two threads operate independently from one another.

Using FIG. 4 as an illustration, after having established the logical connections, any one of the modems, 402, 404, 310 and 312 may initiate a retrain request. Regardless of the origination of the retrain request, enhanced soft modem pool 400 posts the request to common retrain handler 406. Independent from the actions from enhanced soft modem pool 400, one thread of common retrain handler 406 waits for a retrain request to be posted in block 600. When the retrain request is detected, common retrain handler 406 proceeds to verify whether it can safely process the request without dropping the corresponding call in block 602. One embodiment of common retrain handler 406 makes its determination based on Equation 1 as mentioned above.

Depending on the outcome of block 602, either the retrain request is stored in queue 500 as shown in FIG. 5 waiting for further processing or common retrain handler 406 attempts to avoid terminating the call in block 606. However, if recovery attempts fail in block 606, the criteria employed in block 602 such as Equation 1 may need to be reevaluated and possibly be modified. For example, the number of requests, N, may be reduced. In addition, the general line conditions of the connections between enhanced soft modem pool 400 and remote modems 310 and 312 may need to be reexamined.

As one thread of common retrain handler 406 maintains retrain requests in its queue 500, another thread follows the flow chart as shown in FIG. 6(*b*). The thread begins by waiting for retrain requests to process in block 508. When a retrain request is available for processing, RMB 502 of common retrain handler 406 retrieves the request and identifies its corresponding modems. Using the logical connection between remote modem 312 and soft modem 402 as an example: assuming remote modem 312 initiates a retrain request and common retrain handler 406 has decided to queue such a retrain request in its queue 500, RMB 502 is not only responsible to retrieve the request, but is also responsible for correlating soft modem 402 and remote modem 312 to the retrain request in block 610. RMB 502 then passes on the identified information to retrain engine 504, and common retrain handler 406 begins to execute the appropriate retrain sequences for the identified modems in block 612.

Because the described two threads of this embodiment of common retrain handler 406 operate independently, RMB 502 in the embodiment is responsible for delivering appropriate information to retrain engine 504 within a certain period of time. More specifically, using some of the assumptions in Equation (1) and assuming:

$L_1$=the length of time for retrain engine 504 to complete its retrain sequence Then, the certain period of time that RMB 502 has under the circumstances described above equals to $|T_1-T_2|-L_1$.

Although specific examples have been provided to illustrate the operations of an enhanced soft modem pool, one with ordinary skill in the art may implement the illustrated system without all the disclosed details. For example, an ordinarily skilled artisan may further divide or combine the functionality of the discussed components of a common retrain handler or modify the disclosed multi-thread operation approach for a common retrain handler without exceeding the scope of the present invention.

Thus, a method and apparatus for reducing processing requirements of a pool of soft modems has been disclosed. Although an enhanced soft modem pool has been described particularly with reference to the figures, it may appear in any number of network configurations. It is further contemplated that many changes and modifications may be made by one of ordinary skill in the art without departing from the spirit and scope of the present invention.

I claim:

1. A remote access concentrator comprising:
   a memory;
   a processor, coupled to the memory, to operate a pool of soft modems in parallel with a common retrain handler, wherein the common retrain handler comprises
      a queue to store retrain requests,
      a request management block to retrieve the retrain requests and to identify modems that correspond to the retrain requests within a period of time, and
      a retrain engine to perform retrain procedures in accordance with modem standards;
   an interface bus, coupled to the processor, to interface remote modems, wherein the interface bus is a time division multiplexed bus; and
   a host interface, coupled to the processor, to interface a host bus.

2. The remote access concentrator according to claim 1, the retrain requests are either initiated by a remote modem or by the soft modem from the pool.

3. The remote access concentrator according to claim 1, the soft modems are identical.

4. The remote access concentrator according to claim 1, the period of time establishes an allowable number of the queued retrain requests.

5. The remote access concentrator according to claim 4, the request management block further retrieves the queued retrain requests in a first-in-first-out order.

6. The remote access concentrator to claim 4, the request management block further:
   assigns priorities to the queued retrain requests based on an occurrence frequency of the retrain requests; and
   retrieves the queued retrain requests in an order according to the assigned priorities.

\* \* \* \* \*